United States Patent

Izawa et al.

[11] Patent Number: 6,075,297
[45] Date of Patent: Jun. 13, 2000

[54] LINEAR MOTOR

[75] Inventors: Makoto Izawa, Kariya; Katsuhiro Nanba, Osaka, both of Japan

[73] Assignee: Minolta Co., Ltd., Osaka, Japan

[21] Appl. No.: 08/769,275

[22] Filed: Dec. 18, 1996

[30] Foreign Application Priority Data

Dec. 20, 1995 [JP] Japan .................................. 7-332229

[51] Int. Cl.[7] .............................................. H02K 41/00
[52] U.S. Cl. .............................................. 310/12; 310/42
[58] Field of Search ................................ 310/12, 13, 14, 310/180, 44, 42

[56] References Cited

U.S. PATENT DOCUMENTS

| | | | |
|---|---|---|---|
| 4,763,053 | 8/1988 | Rabe | 310/180 X |
| 5,162,684 | 11/1992 | Hayakawa . | |
| 5,371,426 | 12/1994 | Nagate et al. | 310/156 |
| 5,541,461 | 7/1996 | Joseph | 310/71 |

FOREIGN PATENT DOCUMENTS

| | | | |
|---|---|---|---|
| 57-52365 | 3/1982 | Japan . | |
| 59-6767 | 1/1984 | Japan . | |
| 0081966 | 4/1987 | Japan | 310/12 |
| 1-40654 | 6/1988 | Japan | 310/12 |

OTHER PUBLICATIONS

Laith Waite, E.R. and Nasar, S. A. Linear–Motion Electrical Machines, Proceedings of the IEEE vol. 58, No. 4 Apr. 1970 pp. 531–542.

*Primary Examiner*—Thomas M. Dougherty
*Assistant Examiner*—Judson H. Jones
*Attorney, Agent, or Firm*—Burns, Doane, Swecker & Mathis, LLP

[57] ABSTRACT

A linear motor includes an armature coil and a field magnet formed of a plurality of alternately arranged magnetic poles of N- and S-poles, one of the armature coil and the field magnet forming a stator element of the linear motor, and the other forming a movable piece element of the linear motor movable with respect to the stator element. The armature coil has a polygonal section perpendicular to a relative moving direction of the armature coil with respect to the field magnet, and the field magnet is opposed to at least two continuous side surfaces among side surfaces of the armature coil extending along the relative moving direction and has an integral bent form extending along these continuous side surfaces.

28 Claims, 7 Drawing Sheets

LINEAR MOTOR

BACKGROUND OF THE INVENTION

1. Field of the Invention

The present invention relates to a linear motor.

2. Description of the Related Art

Linear motors have been utilized in a wide field of office automation equipment such as copying machines, image scanners and printers, factory automation equipment such as X-Y tables and object transporting devices, and optical equipment such as cameras.

For example, Japanese Laid-Open Patent Publication No. 57-52365 (1982) has proposed a linear motor, which includes a stationary field magnet having a plurality of alternately arranged magnetic poles of N- and S-poles, and a movable armature coil opposed to the field magnet with a gap therebetween. A plane of a central opening of the armature coil is opposed parallel to the field magnet.

Also, Japanese Laid-Open Patent Publication No. 59-6767 (1984) has proposed a structure of a linear motor in which two stationary field magnets each having a plurality of magnetic poles of N- and S-poles arranged alternately are opposed to each other with a gap therebetween, and a movable armature coil is disposed at the gap. In this example, a plane of a central opening of the armature coil is perpendicular to the moving direction of the armature coil.

However, in the linear motor taught by Japanese Laid-Open Patent Publication No. 57-52365, a conductor portion of the armature coil, which is parallel to the lengthwise direction of the field magnet, forms a useless portion which does not contribute to generation of a driving force, resulting in a low efficiency.

The linear motor taught by Japanese Laid-Open Patent Publication No. 59-6767 can produce a much higher driving force than the linear motor disclosed in Japanese Laid-Open Patent Publication No. 57-52365, but suffers from such a problem that fine adjustment of a positional relation between the two magnets is required because the two field magnets are independent of each other.

SUMMARY OF THE INVENTION

Accordingly, an object of the invention is to provide a linear motor, which includes an armature coil and a field magnet formed of a plurality of alternately arranged magnetic poles of N- and S-poles, one of the armature coil and the field magnet forming a movable piece element and the other forming a stator element, and particularly the linear motor which can effectively utilize a conductor portion of the armature coil, allowing generation of a higher driving force of the movable piece element.

Another object of the invention is to provide a linear motor, which includes an armature coil and a field magnet formed of a plurality of alternately arranged magnetic poles of N- and S-poles, one of the armature coil and the field magnet forming a movable piece element and the other forming a stator element, and particularly the linear motor in which a whole structure can be compact in spite of the fact that the movable piece element can produce a large driving force.

Still another object of the invention is to provide a linear motor, which includes an armature coil and a field magnet formed of a plurality of alternately arranged magnetic poles of N- and S-poles, one of the armature coil and the field magnet forming a movable piece element and the other forming a stator element, and particularly the linear motor which allows easy adjustment of arrangement of various elements such as the movable piece element and the stator element.

The invention provides a linear motor (i.e., linear motor of a first type) including:

an armature coil and a field magnet formed of a plurality of alternately arranged magnetic poles of N- and S-poles, one of the armature coil and the field magnet forming a stator element of the linear motor, and the other forming a movable piece element of the linear motor movable with respect to the stator element, wherein the armature coil has a polygonal section perpendicular to a relative moving direction of the armature coil with respect to the field magnet, and the field magnet is opposed to at least two continuous side surfaces among side surfaces of the armature coil extending along the relative moving direction and has an integral bent form extending along these continuous side surfaces.

The linear motor of the first type may utilize any one of the armature coil and the field magnet as the movable piece element (or stator element) of the linear motor.

In the conductor portion of the armature coil having the polygonal section, a portion at the side surface portion opposed to the field magnet forms an effective conductor portion contributing to generation of the driving force.

In the linear motor of the first type, when the armature coil is energized, a mutual action by it and a magnetic field formed by the field magnet produces a force driving the movable piece element in the moving direction. The plurality of (at least two) surfaces of the field magnet having the bent form can act on the conductor portion at the plurality of (at least two) side surfaces of the armature coil opposed thereto so that this conductor portion contributes to generation of the driving force. Therefore, the driving force can be produced efficiently. Since the field magnet having the plururity of surfaces has an integral structure, arrangement of the field magnet and the armature coil can be adjusted easily.

The invention also provides a linear motor (i.e., linear motor of a second type) including:

an armature coil and at least two field magnets each formed of a plurality of alternately arranged magnetic poles of N- and S-poles, the field magnets forming an stator element of the linear motor, and the armature coil forming a movable piece element of the linear motor movable with respect to the stator element of the linear motor, wherein the armature coil has a wound structure around a movable piece yoke having a polygonal section and is movable along a shaft extending through a center of the movable piece yoke, and each of the field magnets is formed of alternately arranged magnetic poles of bent N-poles and bent S-poles located along and opposed to at least two continuous side surfaces of a plurality of side surfaces extending along the moving direction of the armature coil, and each of the field magnets is opposed to the side surfaces of the armature coil other than the side surfaces of the armature coil opposed to the other field magnet(s).

The invention further provides a linear motor (i.e., linear motor of a third type) including:

an armature coil and first and second field magnets each formed of a plurality of alternately arranged magnetic poles of N- and S-poles, the field magnets forming an stator element of the linear motor, and the armature coil forming a movable piece element of the linear motor movable with respect to the stator element of the linear motor, wherein the armature coil has a wound structure around a movable piece yoke having a polygonal section and is movable along a shaft extending through a center of the movable piece yoke, and the first field magnet is opposed to one of a plurality of side surfaces of the armature coil extending along the moving direction, the second field magnet is opposed to the side surface among the plurality of side surfaces other than that opposed to the first field magnet, and both the field magnets are integrally carried by a carrying member.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

[Linear Motor of First Type]

Figure 1A:
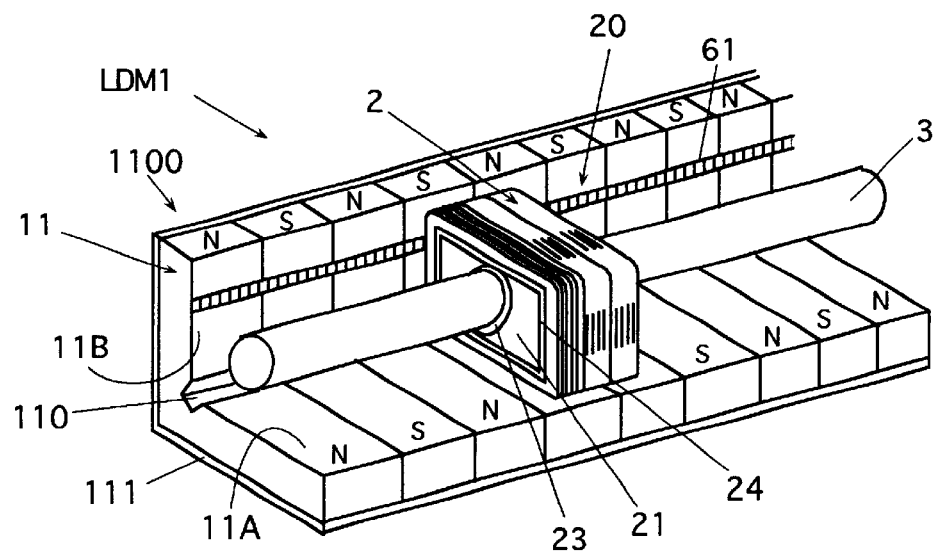
FIG. 1(A) is a schematic perspective view showing an example of a linear motor of a 1-A type according to the invention.

The linear motor of the first type will be described below more in detail.

The field magnet may have the following structure (A) or (B).

(A) The field magnet is formed of the integral magnet poles of bent N- and bent S-poles which are arranged alternately along at least two continuous side surfaces among side surfaces of the armature coil extending along the relative moving direction. The linear motor having the field magnet thus constructed will be referred to as the linear motor of the 1-A type.

(B) The field magnet is formed by a combination of at least two field magnet parts of a plate type, each of which is formed of magnetic poles of N- and S-poles arranged alternately. The field magnet parts are opposed to at least two continuous side surfaces of the armature coil, respectively. The field magnet parts neighboring each other are integrally coupled together by a nonmagnetic member at a position corresponding to a bent corner of the field magnet. The linear motor having the field magnet thus constructed will be referred to as the linear motor of the 1-B type.

The field magnet in the linear motor of the 1-A type preferably has such a structure that the field magnet is provided at its bent corner near or remote from the armature coil with a recess extending in the relative moving direction. By recessing the bent corner to reduce a thickness thereof, the magnetic flux density at the corner can be reduced as will be described later in detail, and thus fluctuation or cogging of the driving force can be suppressed during an operation of the linear motor. The bent corner of the field magnet usually refers to a portion extending in the relative moving direction, and opposed to an apex of a polygon of the armature coil having a polygonal section.

In the linear motor of the 1-B type, the material of the nonmagnetic member of the field magnet may be made of resin, stainless steel or aluminum.

In the structure where the field magnet is formed of the alternately arranged integral magnetic poles of the bent N- and S-poles, when the recess is formed at the bent corner of the field magnet, the following advantages can be achieved. Also in the structure where the field magnet is formed of a combination of the plate-type field magnet parts, when these field magnet parts are coupled together with the nonmagnetic member therebetween, the following advantages can be achieved. Thus, the magnetic flux at the bent corner of the field magnet, which does not contribute to generation of the driving force, can be converged to prevent or reduce an influence on the armature coil. Since generation of such a magnetic flux can be suppressed, cogging of the linear motor can be suppressed.

In the linear motor of the first type, and particularly in such a case that the armature coil forms the movable piece element, the armature coil may have a wound structure formed around a polygonal movable piece yoke to provide the foregoing polygonal configuration, and this armature coil may be movable along the shaft extending through the center of the movable piece yoke. In this structure, the shaft extends in the foregoing moving direction.

For example, the linear motor of the first type may comprise a shaft, a coil bobbin movably provided on said shaft and having a plurality of outer flat surfaces therearound, an armature coil wound around the coil bobbin, and a field magnet formed of a plurality of magnetic poles of N- and S-poles which are arranged alternately in the lengthwise direction of the shaft, said magnet being opposite to at least two continuous outer flat surfaces of said coil bobbin with a gap therebetween, respectively.

Preferred examples of the linear motor of the 1-A type will now be described below as first and second embodiments. Preferred examples of the linear motor of the 1-B type will now be described below as third and fourth embodiments.

(First Embodiment)

Figure 1B:
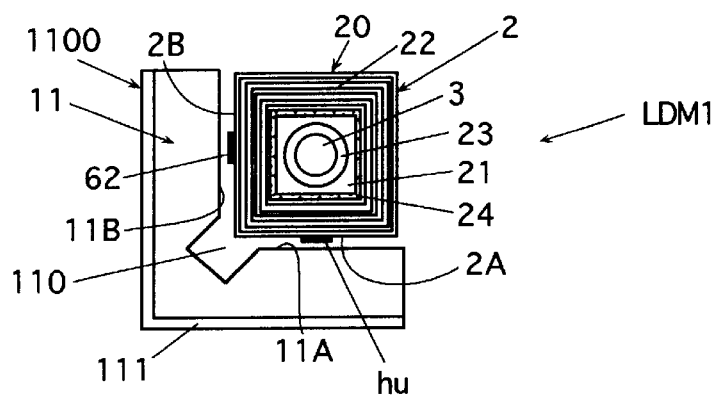
FIG. 1(B) is a schematic elevation of the linear motor.
Figure 1C:
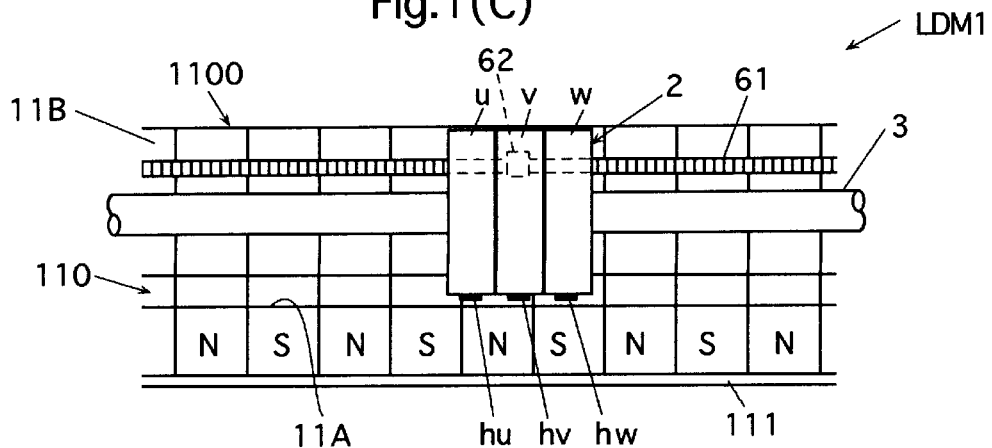
FIG. 1(C)is a schematic side view of the linear motor.

An example of the linear motor of the 1-A type is shown as linear motor LDM1 in FIGS. 1(A), 1(B) and 1(C). FIG. 1(A) is a perspective view of the linear motor, FIG. 1(B) is an elevation of the linear motor, and FIG. 1(C) is a side view of the linear motor.

The linear motor LDM1 has an armature coil 2 forming a movable piece element, a field magnet 11 forming a stator element and a linear motion shaft (guide shaft) 3 of a rod-like form. The armature coil 2 is movable along the linear motion shaft 3.

The armature coil 2 is formed of a conductor wire 22 wound around a movable piece yoke 24 of a substantially square form. The movable piece yoke 24 is formed of a magnetic material and fitted around a coil bobbin 21 which is square in section perpendicular to the moving direction of the armature coil 2. Thereby, the armature coil 2 is square in cross section perpendicular to the moving direction. The coil bobbin 21 is provided at its center portion with a bearing 23 which is slidably fitted around the linear motion shaft 3. These coil bobbin 21, movable piece yoke 24, armature coil 2 and bearing 23 form a movable piece 20, which is movable along the linear motion shaft 3 owing to the bearing 23.

The armature coil 2 is formed of three-phase coils u, v and w which are shifted from each other by an electrical angle of $\pi \cdot 2/3$ (or may be arranged at positions of the same phases as those shifted from each other by $\pi \cdot 2/3$), and each has a substantially square form.

The opposite ends of the linear motion shaft 3 is carried by unillustrated carrying means.

The field magnet 11 is formed of a plurality of magnetic poles of bent N- and S-poles which are arranged alternately in the lengthwise direction of the linear motion shaft 3 and each have an L-shaped section. A stator yoke 111 having an L-shaped section is joined to the outer periphery of the field magnet 11, whereby a stator 1100 is formed. A recess extending in the moving direction of the movable piece is formed at a bend corner 110 of the field magnet 11 near the armature coil 2. The field magnet 11 forms a magnetic field in a sinusoidal waveform extending along the moving direction of the movable piece and having a cycle including one N-pole and one S-pole.

The field magnet 11 is arranged such that two surfaces 11A and 11B of the field magnet 11 extending along the movable piece moving direction and located near the armature coil 2 are opposed to two continuous side surfaces 2A and 2B extending in the moving direction of the armature coil 2 with a gap therebetween, respectively.

The field magnet 11 is provided at its side surface 11B with an encoder scale 61, which is formed of a plurality of N- and S-poles alternately arranged at a fine pitch along the movable piece moving direction and is overlapped over the field magnet 11. The movable armature coil 2 is provided with a magnetic sensor (i.e., magnetic resistor element called an MR element in this embodiment) 62 opposed to the encoder scale 61. The encoder scale 61 and the magnetic sensor 62 form a magnetic encoder. The encoder can detect the position and speed of the movable piece 20, and, in this embodiment, is utilized also for operation control of the linear motor LDM1 as will be described later. The encoder scale 61 may not be formed at the field magnet 11 in the overlapped manner as described above, but may be formed at a magnetizable member extending in the movable piece moving direction. In this case, the magnetic sensor detecting the magnetic information of the encoder scale is arranged on the armature coil 2 and opposed to the scale. Instead of the magnetic encoder, an optical encoder may be employed.

For operation control of the linear motor LDM1, the u-phase coil is provided with a Hall element hu which is a kind of magnetoelectric element and is used as a position sensing element. Likewise, the v-phase coil is provided with a Hall element hv, and the w-phase coil is provided with a Hall element hw. These Hall elements are opposed to the side surface 11A of the field magnet 11.

The advantages of the structure in which a recess is formed at the bent corner 110 of the field magnet 11 near the armature coil will be described below with reference to FIGS. 2(A), 2(B), 3(A) and 3(B).

Figure 2A:
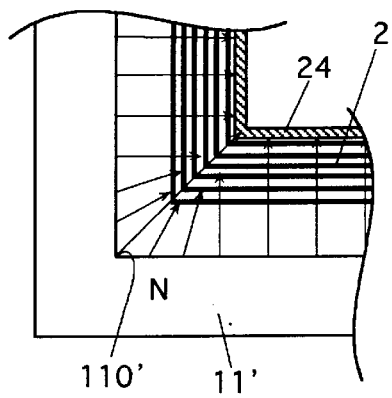
FIGS. 2(A) and 2(B) show a magnetic field around a bent corner of a field magnet not provided with a recess, FIG. 2(A) showing a section of the field magnet and the magnetic field, and FIG. 2(B) showing a side surface of the field magnet and the magnetic field.
Figure 2B:
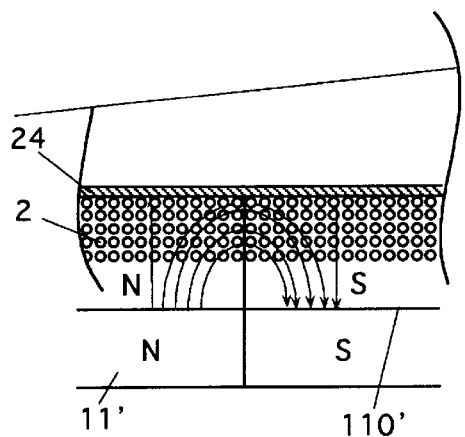

A field magnet 11' shown in FIGS. 2(A) and 2(B) is not provided at its bent corner 110' with a recess. Particularly, FIG. 2(A) shows the magnetic field and the section of the field magnet perpendicular to the movable piece moving direction, and FIG. 2(B) shows the magnetic field and the side surface of the field magnet.

Figure 3A:
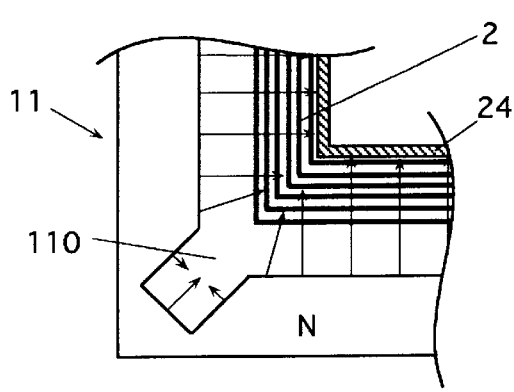
FIGS. 3(A) and 3(B) show a magnetic field around a bent corner of a field magnet provided with a recess, FIG. 3(A) showing a section of the field magnet and the magnetic field, and FIG. 3(B) showing a side surface of the field magnet and the magnetic field.
Figure 3B:
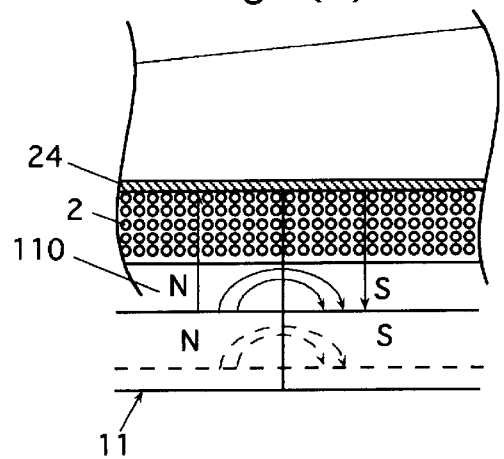

FIGS. 3(A) and 3(B) show the field magnet 11 according to the invention, which is provided at its bent corner 110 with a recess. Particularly, FIG. 3(A) shows the magnetic field and the section of the field magnet perpendicular to the movable piece moving direction. FIG. 3(B) shows the magnetic field and the side surface of the field magnet. In FIGS. 2(A), 2(B), 3(A) and 3(B), lines with arrows show the magnetic flux.

In the structure where the field magnet is not provided at the bent corner with the recess as shown in FIGS. 2(A) and 2(B), the magnetic flux is radiated from the N-pole of the field magnet 11' toward the armature coil 2, passes through the movable piece yoke 24, passes also through the armature coil 2, and returns to the S-pole of the field magnet 11'. At the vicinities of the N- and S-poles, however, the magnetic flux is directly radiated from the N-pole to the S-pole without through the movable piece yoke 24, and these magnetic flux has a high density particularly at the bent corner 110'. The magnetic flux generated at the bent corner 110' does not contribute to the driving force in the travelling direction, rather causing fluctuation of the driving force or cogging.

In the structure where the field magnet 11 is provided at its bent corner 110 with the recess as shown in FIGS. 3(A) and 3(B), the magnetic flux at the bent corner 110 is radiated only inside the same, so that the influence of the magnetic flux exerted on the armature coil 2 can be prevented or reduced to an ignorable extent. This is also owing to the fact that the recessed portion is thin, and therefore the flux density itself is small at the recessed portion.

Figure 4:
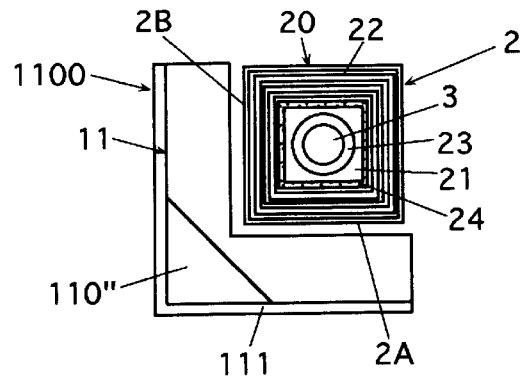
FIG. 4 shows another example of a recess formed at the bent corner of the field magnet.

As shown in FIG. 4, the field magnet 11 may be provided at a bent corner 110" remote from the armature coil 2 with a recess extending in the movable piece moving direction. Since this recess also reduces the thickness of the field magnet 11 at the recessed portion, the magnetic flux at the recessed portion can be reduced, so that an effect similar to the structure having the recess at the portion of the field magnet near the armature coil 2 can be achieved.

An operation control of the linear motor LDM1 will be described below. Operations of linear motors LDM2, LDM3, LDM4, LDM5 and LDM6 which will be described later can be controlled in a similar manner.

As already described, the field magnet 11 of the stator 1100 produces the magnetic field in a sinusoidal wave form of which one cycle contains one N-pole and one S-pole. The armature coil 2 of the movable piece 20 is formed of the three-phase coils u, v and w which are shifted from each other by an electrical angle of $\pi \cdot 2/3$ (or may be arranged at positions of the same phases as those shifted from each other by $\pi \cdot 2/3$). The movable piece 20 is provided with the Hall elements hu, hv and hw. Each Hall element in this embodiment senses the magnitude and direction of the magnetic flux of the field magnet 11 at its position. A current corresponding to the magnitude and direction sensed by the Hall element is supplied to the coil, whereby the motor LDM1 is driven. Thus, this embodiment employs a so-called three-phase driving system in which signals shifted from each other by a phase of 120 degrees are supplied to the coils, and consequently a constant driving force can be produced regardless of the position of the movable piece 20. In this embodiment, the three-phase driving system is employed, and the movable piece 20 is to be driven at an intended speed. For this purpose, a phase-locked-loop servocontrol system generally called a PLL is employed.

Figure 5A:
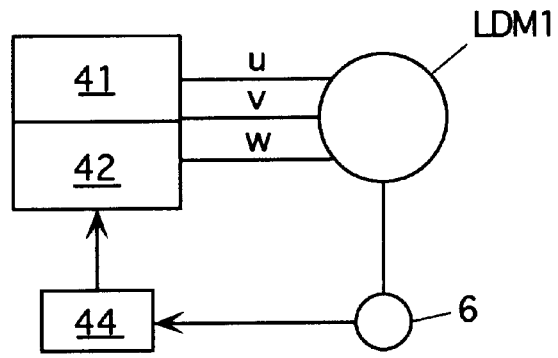
FIG. 5(A) is a block diagram schematically showing an operation control circuit of the linear motor.
Figure 5B:
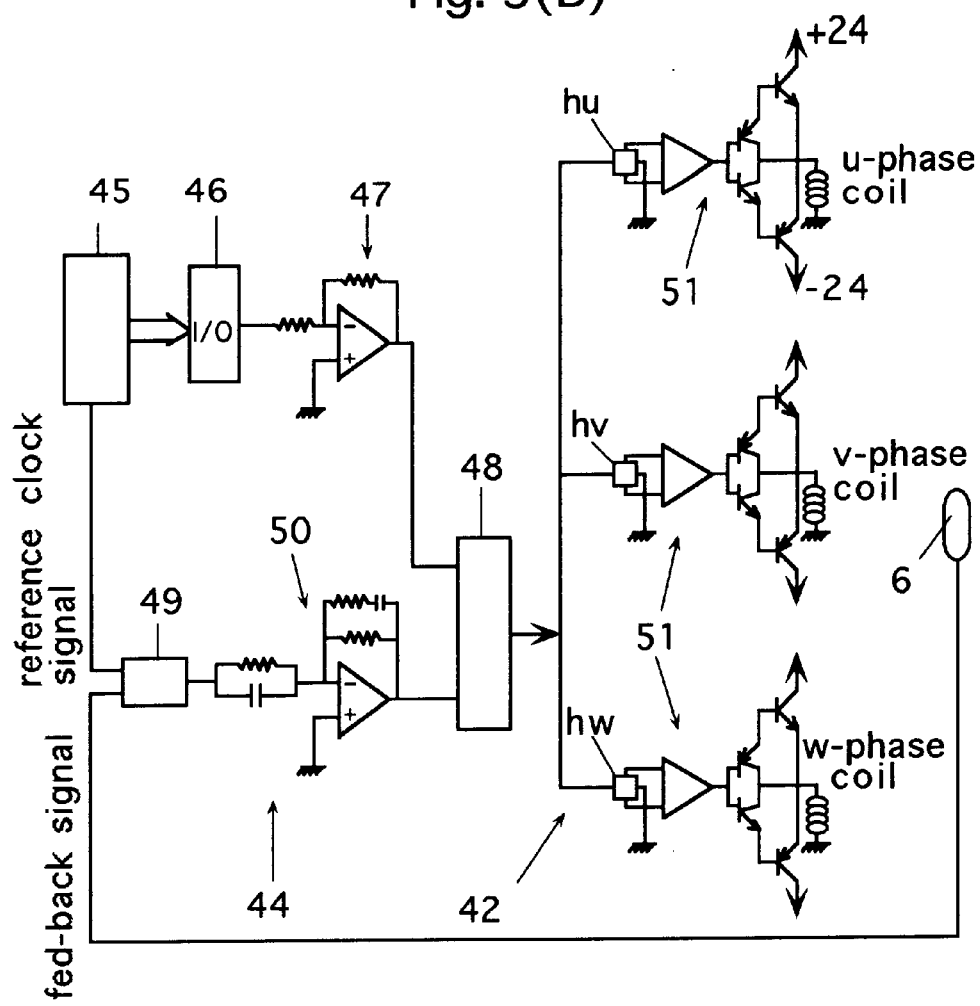
FIG. 5(B) shows a major portion of the operation control circuit including a speed control circuit performing a PLL servo-control.

FIG. 5(A) is a schematic block diagram of an electric circuit for controlling the operation of the motor LDM1, and FIG. 5(B) shows a major portion of the operation control circuit including a speed control circuit performing the PLL servocontrol.

In FIGS. 5(A) and 5(B), 41 indicates a DC source, 42 indicates a current supply control circuit including the Hall elements and others, and 6 indicates an encoder for sensing a moving speed of the movable piece 20. The encoder 6 includes the magnetic sensor 62 (see FIG. 1(B)). Feature 44 indicates a speed controller performing the phase-locked-loop servocontrol. The encoder 6 is an encoder of a magnetic type, in which the magnetic sensor 62 on the movable piece 20 reads the magnetism of the encoder scale 61 on the stator 1100.

In FIG. 5(B), 45 indicates a microcomputer which sends a reference clock signal to a phase synchronous controller 49. Feature 46 indicates an input/output port of the computer 45, 47 indicates an amplifier, and 48 indicates a switching unit. Feature 49 indicates the phase synchronous controller, 50 indicates a compensation circuit, and 51 indicates an amplifier circuit.

According to the control circuit shown in FIGS. 5(A) and 5(B), the computer 45 supplies the reference clock signal corresponding to an intended speed to the phase synchronous controller 49, and the moving speed signal of the movable piece 20 is fed back from the encoder 6 to the controller 49. The phase synchronous controller 49 issues a signal depending on differences in the frequency and phase between the pulse of the reference clock and the pulse of the signal fed back from the encoder 6. The compensation circuit 50 compensates gaining or losing in a transferring system to output a voltage which is used as a reference input voltage of the Hall elements. Each Hall element, which is already described, outputs a voltage corresponding to the magnitude and direction of the magnetic flux at its position, and the output voltage from the Hall element has such characteristic that it is proportional to the reference input voltage. Accordingly, the output voltages corresponding to the reference clock signal and the fed-back signal are produced from the Hall elements. The output voltage from the Hall element is proportionally amplified by the amplifier circuit 51, and the current is supplied to the armature coil. In this manner, the pulse of the reference clock and the pulse of the fedback signal are processed to have the equal frequency and the equal phase. In other words, the motor LDM1 is operated to attain the intended speed of the movable piece 20.

According to the linear motor LDM1 of the invention, as described above, the integral structure of the field magnet 11 having an L-shaped section can achieve such an advantage that adjustment of arrangement of the field magnet 11 itself as well as adjustment of relative arrangement of the field magnet 11 and the armature coil 2 can be performed easily in the assembly process. Also, the conductor portion at the two side surfaces 2A and 2B of the armature coil 2 can be utilized to contribute to generation of the driving force, and thus the driving force can be increased. Further, the structure can be compact in spite of the high driving force.

Owing to provision of the recess at the bent corner 110 of the field magnet 11, cogging of the linear motor can be suppressed more effectively than the structure without a recess at the bent corner.

(Second Embodiment)

Figure 6A:
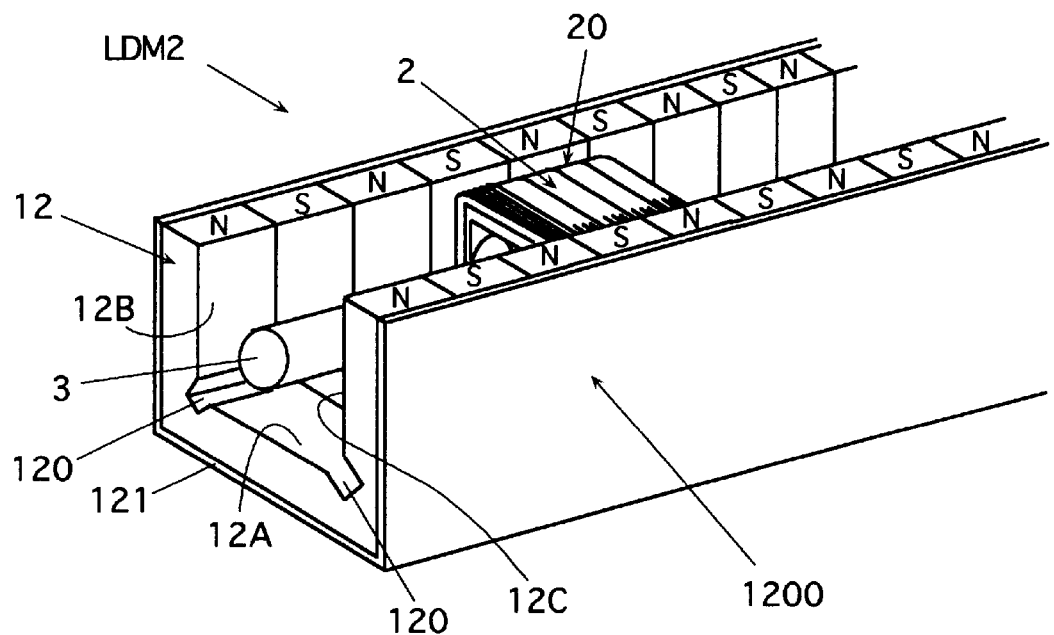
FIG. 6(A) is a schematic perspective view showing another example of a linear motor of the 1-A type according to the invention.
Figure 6B:
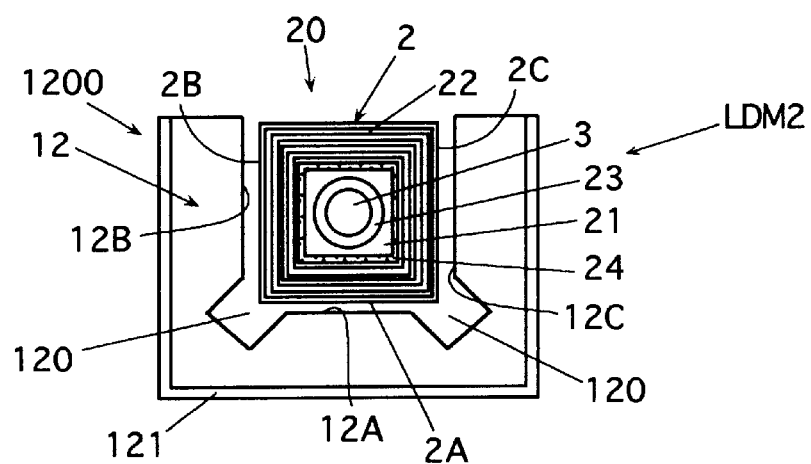
FIG. 6(B) is a schematic elevation of the linear motor.

Another example of the linear motor of the 1-A type will be described below as the linear motor LDM2 with reference to FIGS. 6(A) and 6(B). FIG. 6(A) is a perspective view of the linear motor LDM2, and FIG. 6(B) is an elevation of the linear motor LDM2. The parts and portions similar to those of the linear motor LDM1 shown in FIG. 1 bear the same reference numbers or symbols.

The linear motors LDM1 and LDM2 have the substantially same structures except for the forms of field magnets. Similarly to the linear motor LDM1, the linear motor LDM2 has a movable piece 20 including the armature coil 2, a stator 1200 including a field magnet 12, and the rod-like linear motion shaft 3. The movable piece 20 including the armature coil 2 is movable along the linear motion shaft 3.

The armature coil 2 has the same structure as that shown in FIG. 1, and thus is square in cross section perpendicular to the moving direction of the movable piece 20.

The field magnet 12 is formed of a plurality of integral magnetic poles of bent N- and S-poles having U-shaped sections and arranged alternately along the lengthwise direction of the linear motion shaft 3. A stator yoke 121 having a U-shaped section is joined to the outer periphery of the field magnet 12, whereby the stator 1200 is completed. The field magnet 12 is provided at its bent corners 120 near the armature coil 2 with recesses extending along the moving direction of the movable piece.

The field magnet 12 is arranged such that three surfaces 12A, 12B and 12C extending along the movable piece moving direction and located near the armature coil 2 are opposed to three continuous side surfaces 2A, 2B and 2C extending in the moving direction of the armature coil 2 with gaps therebetween, respectively.

Owing to the integral structure and the U-shaped section of the field magnet 12, the linear motor LDM2 can likewise achieve such advantages that arrangement of the field magnet 12 itself as well as relative arrangement of the field magnet 12 and the armature coil 2 can be performed easily in the assembly process, and the conductor portion at the three side surfaces 2A, 2B and 2C of the armature coil 2 can be utilized to contribute to generation of a driving force. Therefore, the linear motor LDM2 can generate a larger driving force than the linear motor LDM1 shown in FIG. 1. Also, the structure can be compact in spite of the fact that it can generate a large driving force.

Owing to provision of the recess at the bent corners 120 of the field magnet 12, cogging of the linear motor can be suppressed compared with the structure without a recess at the bent corners.

(Third Embodiment)

Figure 7A:
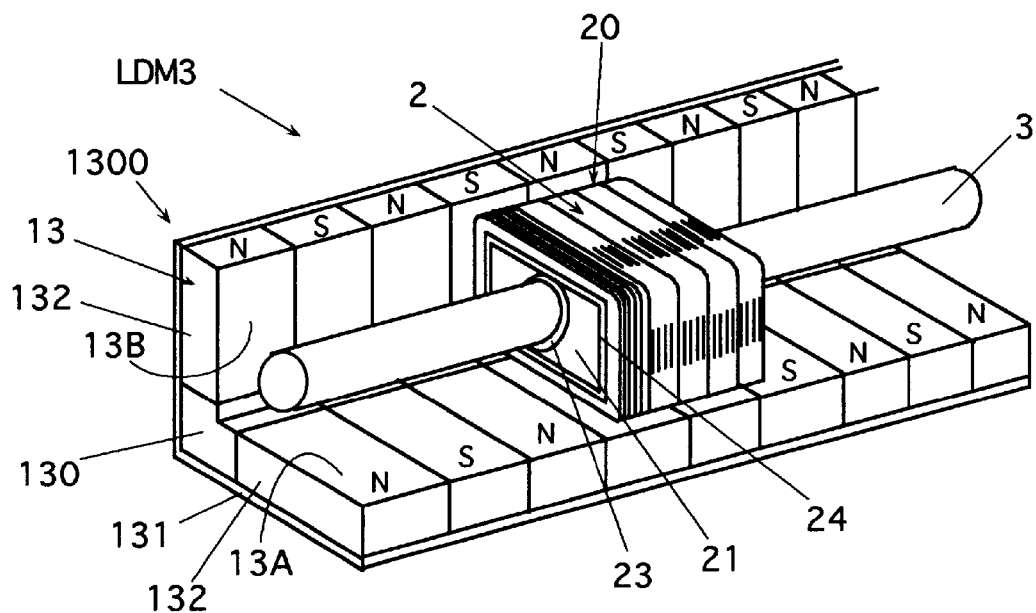
FIG. 7(A) is a schematic perspective view showing an example of a linear motor of a 1-B type according to the invention.
Figure 7B:
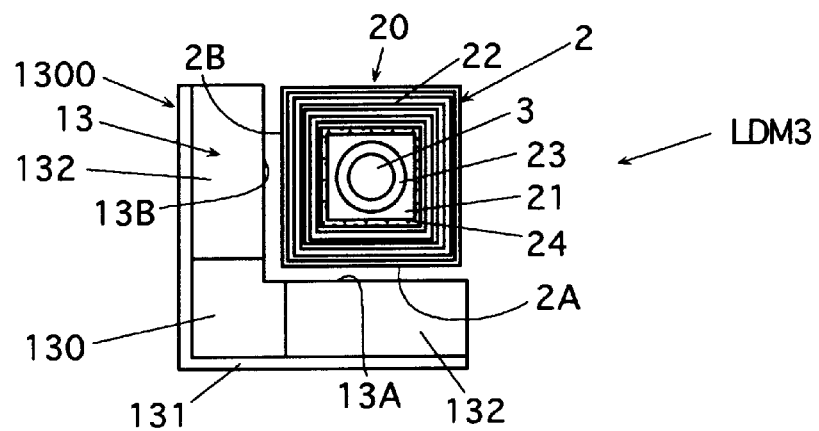
FIG. 7(B) is a schematic elevation of the linear motor.

An example of the linear motor of the 1-B type will be described below as the linear motor LDM3 with reference to FIGS. 7(A) and 7(B). FIG. 7(A) is a perspective view of the linear motor LDM3, and FIG. 7(B) is an elevation of the linear motor LDM3. The parts and portions similar to those of the linear motor LDM1 shown in FIG. 1 bear the same reference numbers or symbols.

The linear motor LDM3 has the substantially same structure as the linear motor LDM1 shown in FIG. 1 except for the form of a field magnet 13. Similarly to the linear motor LDM1, the linear motor LDM3 has the movable piece 20 including the armature coil 2, a stator 1300 including the field magnet 13, and the rod-like linear motion shaft 3. The movable piece 20 including the armature coil 2 is movable along the linear motion shaft 3.

The armature coil 2 has the same structure as that shown in FIG. 1, and thus is square in cross section perpendicular to the moving direction of the movable piece 20.

The field magnet 13 has an integral structure as a whole, in which two plate-type field magnet parts 132, each formed of a plurality of magnetic poles of flat N- and S-poles arranged alternately, are joined to a stator yoke 131 having an L-shaped section, and the field magnet parts 132 are coupled together by a nonmagnetic member 130. The field magnet 13 is L-shaped in section perpendicular to the moving direction of the armature coil 2, as a whole.

The field magnet 13 is arranged such that two surfaces 13A and 13B extending along the movable piece moving direction and located near the armature coil 2 are opposed to two continuous side surfaces 2A and 2B extending in the moving direction of the armature coil 2 with gaps therebetween, respectively.

Figure 8A:
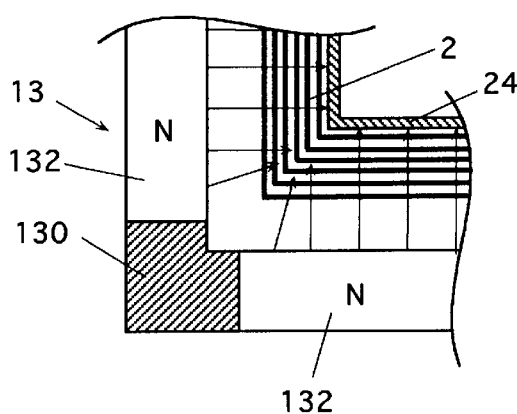
FIGS. 8(A) and 8(B) show a magnetic field around a nonmagnetic member arranged at a position corresponding to a bent corner of the field magnet, FIG. 8(A) showing a section of the field magnet and the magnetic field, and FIG. 8(B) showing a side surface of the field magnet and the magnetic field.
Figure 8B:
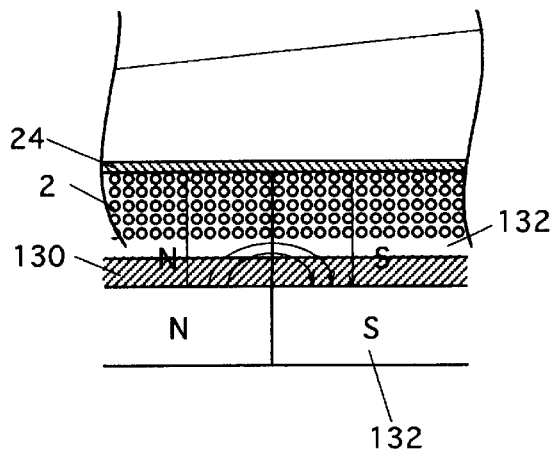

Owing to the integral structure and the L-shaped section of the field magnet 13, the linear motor LDM3 can likewise achieve such advantages that arrangement of the field magnet 13 itself as well as relative arrangement of the field magnet 13 and the armature coil 2 can be performed easily in the assembly process, and the conductor portion at the two surfaces 2A and 2B of the armature coil 2 can be utilized to contribute to generation of a driving force. Therefore, the linear motor LDM3 can generate a large driving force in spite of the fact that the adjustment can be performed easily. Also, the whole structure can be compact in spite of the fact that it can generate a large driving force. Since the nonmagnetic member 130 is arranged at the position corresponding to the bent corner of the field magnet 13, and therefore a magnetic flux is not produced inside the nonmagnetic member 130 as shown in FIG. 8, cogging of the linear motor can be suppressed compared with the case where a magnetic member is arranged at the position corresponding to the bent corner. FIG. 8(A) shows the magnetic field and the section of the field magnet 13, and FIG. 8(B) shows the magnetic field and the side surface of the field magnet 13. In the figures, lines with arrows represent the magnetic flux.

(Fourth Embodiment)

Figure 9A:
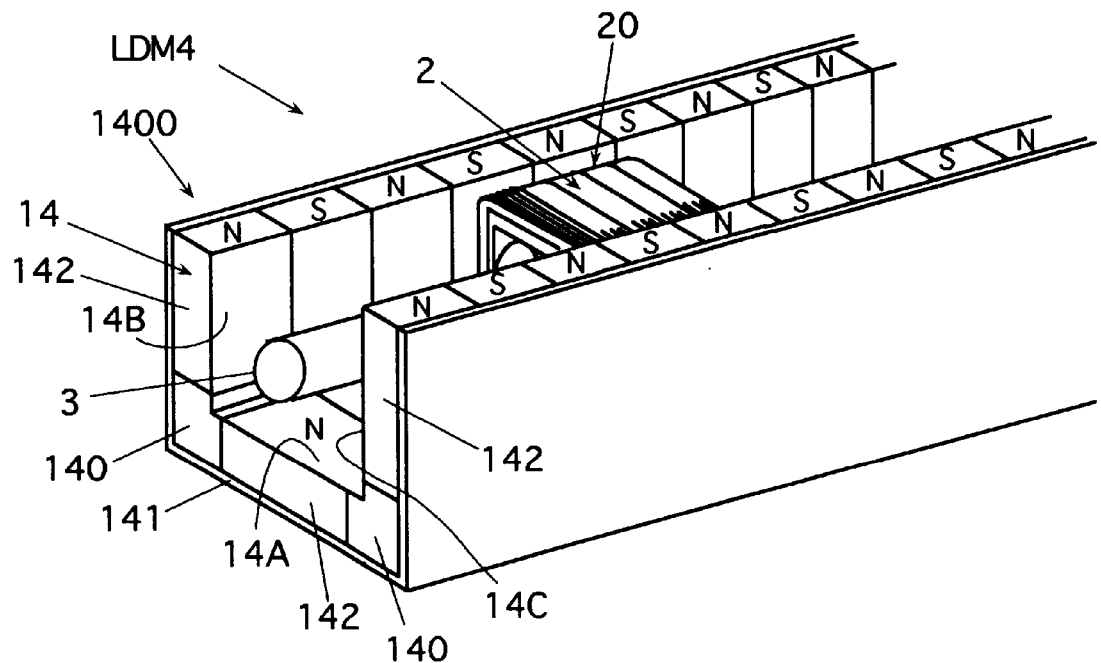
FIG. 9(A) is a schematic perspective view of another example of the linear motor of the 1-B type according to the invention.
Figure 9B:
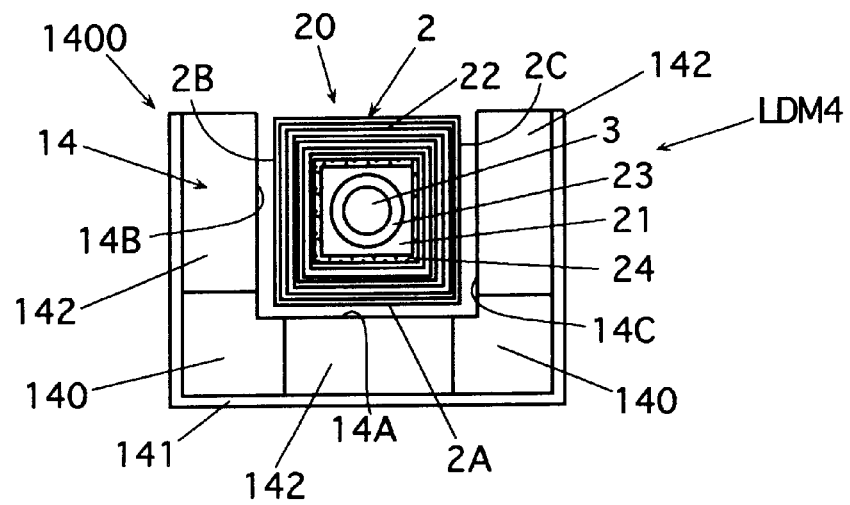
FIG. 9(B) is a schematic elevation of the linear motor.

Another example of the linear motor of the 1-B type will be described below as the linear motor LDM4 with reference to FIGS. 9(A) and 9(B). FIG. 9(A) is a perspective view of the linear motor LDM4, and FIG. 9(B) is an elevation of the linear motor LDM4. The parts and portions similar to those of the linear motor LDM1 shown in FIG. 1 bear the same reference numbers or symbols.

The linear motor LDM4 shown in FIGS. 9(A) and 9(B) has the substantially same structures as the linear motor LDM2 shown in FIG. 6(A) except for the forms of field magnets. Similarly to the linear motor LDM2, the linear motor LDM4 has the movable piece 20 including the armature coil 2, a stator 1400 including a field magnet 14, and the rod-like linear motion shaft 3. The armature coil 2 is movable along the linear motion shaft 3.

The armature coil 2 has the same structure as that shown in FIG. 1, and thus is square in cross section perpendicular to the moving direction of the movable piece 20.

The field magnet 14 has an integral structure as a whole, in which plate-type three field magnet parts 142, each formed of a plurality of flat N- and S-poles arranged alternately, are joined to a stator yoke 141 having a U-shaped section, and the neighboring field magnets 142 are coupled together by nonmagnetic members 140. The field magnet 14 is U-shaped in a section perpendicular to the moving direction of the armature coil 2 as a whole.

The field magnet 14 is arranged such that three surfaces 14A, 14B and 14C extending in the movable piece moving direction and located near the armature coil 2 are opposed to three continuous side surfaces 2A, 2B and 2C extending in the moving direction of the armature coil 2 with gaps therebetween, respectively.

Owing to the integral structure and the U-shaped section of the field magnet 14, the linear motor LDM4 can likewise achieve such advantages that arrangement of the field magnet 14 itself as well as relative arrangement of the field magnet 14 and the armature coil 2 can be performed easily in the assembly process, and the conductor portion at the three side surfaces 2A, 2B and 2C of the armature coil 2 can be utilized to contribute to generation of a driving force. Therefore, the linear motor LDM4 can generate a large driving force. Also, the whole structure can be compact in spite of the fact that it can generate a large driving force. Since the nonmagnetic member 140 is arranged at the position corresponding to the bent corner of the field magnet 14, cogging of the linear motor LDM4 can be suppressed compared with the case where a magnetic member is arranged at the position corresponding to the bent corner.

[Linear Motor of the Second Type]

The linear motor of the second type will be described below more in detail.

The linear motor of the second type includes two or more field magnets, each of which is the same as that of the linear motor of the foregoing 1-A type. These field magnets form stator element of the linear motor, and an armature coil having a polygonal section forms a movable piece element of the linear motor. Each field magnet is opposed to side surfaces of the armature coil other than the side surfaces to which another field magnet is opposed.

In the linear motor of the second type, it is preferable that a bent corner of the field magnet near or remote from the armature coil is recessed in the movable piece moving direction.

A preferred example of the linear motor of the second type will be described below as a fifth embodiment.

(Fifth Embodiment)

Figure 10:
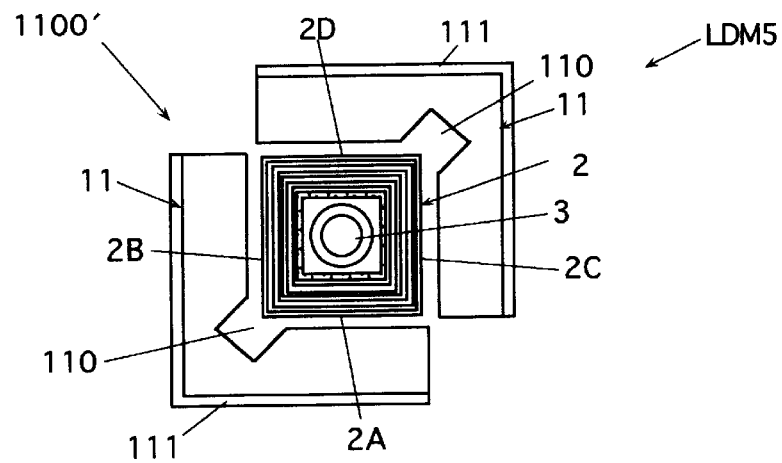
FIG. 10 is a schematic elevation of an example of a linear motor of a second type according to the invention.

An example of the linear motor of the second type will be described below as the linear motor LDM5 with reference to FIG. 10. FIG. 10 is an elevation of the linear motor LDM5. The parts and portions similar to those of the linear motor LDM1 shown in FIG. 1 bear the same reference numbers or symbols.

The linear motor LDM5 has the substantially same structure as the linear motor LDM1 shown in FIG. 1 except for the structure of the stator. Similarly to the linear motor LDM1, the linear motor LDM5 has the movable piece 20 including the armature coil 2, a stator 1100' including the field magnets 11, and the rod-like linear motion shaft 3. The movable piece 20 having the armature coil 2 is movable along the linear motion shaft 3.

The armature coil 2 has the same structure as that shown in FIG. 1, and thus is square in cross section perpendicular to the moving direction of the movable piece 20.

The linear motor LDM5 includes the two field magnets, each of which is the same as the field magnet 11 shown in FIG. 1. Thus, each field magnet 11 has a structure, in which a plurality of magnetic poles formed of bent N- and S-poles each having an L-shaped section are arranged alternately, and a recess extending in the movable piece moving direction is formed at its bent corner 110. One of the field magnets 11 is opposed to the side surfaces 2A and 2B extending along the moving direction of the armature coil 2, and the other field magnet 11 is opposed to the other side surfaces 2C and 2D.

The linear motor LDM5 can facilitate adjustment of arrangement of the field magnets 11 and the armature coil 2 compared with a linear motor in which all the side surfaces of the armature coil 2 are surrounded only by one field magnet having a hollow square section, and can produce a driving force equal to that by the latter. Since each field magnet 11 is provided at its bent corner with a recess, cogging of the linear motor LDM5 can be suppressed similarly to the linear motor LDM1 in FIG. 1.

[Linear Motor of the Third Type]

The linear motor of the third type will be described below more in detail.

The carrying member may include a nonmagnetic member interposed between the first and second field magnets. The nonmagnetic member may be made of a material such as resin, stainless steel or aluminum.

The linear motor of the third type may have such a structure in which one or more combinations each including the first and second field magnets which are integrally carried by the carrying member are further employed, and are opposed to different side surfaces of the armature coil, respectively. In this structure including two or more combinations of the first and second field magnets integrally carried by the carrying member, each carrying member of the combination may include a nonmagnetic member interposed between the first and second field magnets. The nonmagnetic member may be made of a material such as resin, stainless steel or aluminum.

The linear motor of the third type including the two or more combinations described above is provided with two or more field magnets each being the same as that in the linear motor of the 1-B type. These field magnets forms the stator element of the linear motor, and the armature coil of a polygonal section forms the movable piece element. A preferred example of the linear motor of the third type including the two or more combinations will be described below as a sixth embodiment.

(Sixth Embodiment)

Figure 11:
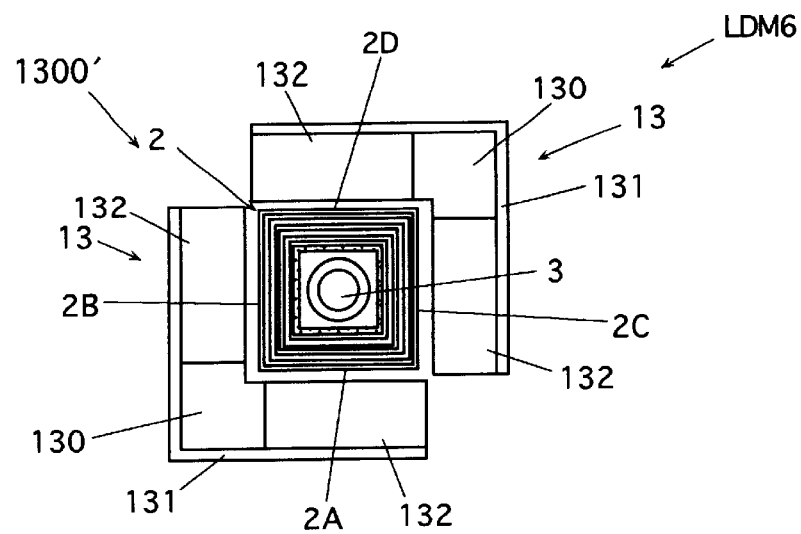
FIG. 11 is a schematic elevation of an example of a linear motor of a third type according to the invention.

An example of the linear motor of the third type is shown as the linear motor LDM6 in FIG. 11. FIG. 11 is an elevation of the linear motor LDM6. The parts and portions similar to those of the linear motor LDM1 shown in FIG. 1 bear the same reference numbers.

The linear motor LDM6 has the substantially same structure as the linear motor LDM3 shown in FIG. 7(A) except for the structure of the stator. Similarly to the linear motor LDM3, the linear motor LDM6 has the movable piece 20 including the armature coil 2, the stator 1300' including the field magnets 13, and the rod-like linear motion shaft 3. The movable piece 20 having the armature coil 2 is movable along the linear motion shaft 3.

The armature coil 2 has the same structure as that shown in FIG. 1, and thus is square in section perpendicular to the moving direction of the movable piece.

The linear motor LDM6 includes two combinations, each of which is formed of the two field magnets integrally carried by the carrying member. Each combination has the same structure as the stator 1300 of the linear motor LDM3 shown in FIGS. 7(A) and 7(B). Thus, each combination has an integral L-shaped structure as a whole, in which two plate-type field magnet parts 132, each formed of a plurality of flat N- and S-poles arranged alternately in the moving direction of the armature coil 2, are joined to the stator yoke 131 having an L-shaped section, and the field magnet parts 132 are coupled together by the nonmagnetic member 130.

The field magnets 132 in one of the combinations are opposed to the side surfaces 2A and 2B extending in the moving direction of the armature coil 2, respectively. The field magnets 132 in the other combination are opposed to the other side surfaces 2C and 2D, respectively. These two combinations form the stator 1300'.

The linear motor LDM6 can facilitate adjustment in arrangement of the field magnets 13 and the armature coil 2 compared with the linear motor in which all the side surfaces of the armature coil 2 are surrounded only by one field magnet having a hollow square section, and can produce a driving force equal to that by the latter. Since nonmagnetic member 130 is arranged at the position corresponding to the bent corner of the field magnet 13, cogging of the linear motor LDM6 can be suppressed similarly to the linear motor LDM3.

In the linear motors LDM1, LDM2, LDM3, LDM4, LDM5 and LDM6 described above, the armature coil is square in section perpendicular to the movable piece moving direction. However, the sectional shape is not restricted to the square, but may be a polygon other than the square, in which case a similar effect can be achieved. However, it is difficult to produce a polygonal armature having excessively many corners and a field magnet corresponding to the same. Therefore, triangle, square and pentagon are preferable, although not restricted to them.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A linear motor comprising:
   an armature coil and a field magnet formed of a plurality of alternately arranged magnetic poles of N- and S-poles,
      one of said armature coil and said field magnet forming a stator element of said linear motor, and the other forming a movable piece element of said linear motor movable with respect to said stator element, wherein
      said armature coil has a polygonal section perpendicular to a relative moving direction of said armature coil with respect to said field magnet, and said field magnet is opposed to at least two continuous side surfaces among side surfaces of said armature coil extending along said relative moving direction and has an integral bent form extending along said continuous side surfaces.

2. The linear motor according to claim 1, wherein said field magnet is formed of the integral magnet poles of bent N- and bent S-poles which are arranged alternately along at least two continuous side surfaces among side surfaces of said armature coil extending along said relative moving direction.

3. A linear motor comprising:
   an armature coil and a field magnet formed of a plurality of alternately arranged magnetic poles of N- and S-poles, one of said armature coil and said field magnet forming a stator element of said linear motor, and the other forming a movable piece element of said linear motor movable with respect to said stator element, wherein said armature coil forms at least two continuous side surfaces extending in a relative moving direction of said armature coil with respect to said field magnet, and said field magnet is opposed to at least said continuous side surfaces of said armature coil and has an integral bent form extending along said continuous side surfaces, wherein said field magnet is formed of the integral magnet poles of bent N- and S-poles which are arranged alternately along at least said continuous side surfaces of said armature coil, and further wherein said field magnet is provided at its bent corner near said armature coil with a recess extending along said relative moving direction.

4. A linear motor comprising:

an armature coil and a field magnet formed of a plurality of alternately arranged magnetic poles of N- and S-poles, one of said armature coil and said field magnet forming a stator element of said linear motor, and the other forming a movable piece element of said linear motor movable with respect to said stator element, wherein said armature coil forms at least two continuous side surfaces extending in a relative moving direction of said armature coil with respect to said field magnet, and said field magnet is opposed to at least said continuous side surfaces of said armature coil and has an integral bent form extending along said continuous side surfaces, wherein said field magnet is formed of the integral magnet poles of bent N- and S-poles which are arranged alternately along at least said continuous side surfaces of said armature coil, and further wherein said field magnet is provided at its bent corner remote from said armature coil with a recess extending along said relative moving direction.

5. A linear motor comprising:

an armature coil and a field magnet formed of a plurality of alternately arranged magnetic poles of N- and S-poles, one of said armature coil and said field magnet forming a stator element of said linear motor, and the other forming a movable piece element of said linear motor movable with respect to said stator element, wherein said armature coil forms at least two continuous side surfaces extending in a relative moving direction of said armature coil with respect to said field magnet, and said field magnet is opposed to at least said continuous side surfaces of said armature coil and has an integral bent form extending along said continuous side surfaces, and wherein said field magnet is formed by a combination of at least two field magnet parts of a plate type integrated together, each being formed of magnetic poles of N- and S-poles arranged alternately, said field magnet parts are opposed to said at least two continuous side surfaces of said armature coil, respectively, and said field magnet parts neighboring each other are integrally coupled together by a nonmagnetic member at a position corresponding to a bent corner of said field magnet.

6. A linear motor comprising:

an armature coil and a field magnet formed of a plurality of alternately arranged magnetic poles of N- and S-poles, one of said armature coil and said field magnet forming a stator element of said linear motor, and the other forming a movable piece element of said linear motor movable with respect to said stator element, wherein said armature coil forms at least two continuous side surfaces extending in a relative moving direction of said armature coil with respect to said field magnet, and said field magnet is opposed to at least said continuous side surfaces of said armature coil and has an integral bent form extending along said continuous side surfaces, and wherein said armature coil is said movable piece element, said armature coil has a wound structure around a polygonal movable piece yoke to provide a polygonal section of said armature coil and said armature coil is movable along a shaft extending through a center of said movable piece yoke.

7. A linear motor comprising:

an armature coil and at least two field magnets each formed of a plurality of alternately arranged magnetic poles of N- and S-poles, said field magnets forming a stator element of said linear motor, and said armature coil forming a movable piece element of said linear motor movable with respect to said stator element of said linear motor, wherein said armature coil has a wound structure around a movable piece yoke having a polygonal section and is movable along a shaft extending through a center of said movable piece yoke, and each of said field magnets is formed of alternately arranged magnetic poles of bent N-poles and bent S-poles located along and opposed to at least two continuous side surfaces of a plurality of side surfaces extending along the moving direction of said armature coil, and each of said field magnets is opposed to the side surfaces of said armature coil other than the side surfaces of said armature coil opposed to the other field magnet(s).

8. The linear motor according to claim 7, wherein each of said field magnets is provided at its bent corner near said armature coil with a recess extending in said moving direction.

9. The linear motor according to claim 7, wherein each of said field magnets is provided at its bent corner remote from said armature coil with a recess extending in said moving direction.

10. A linear motor comprising:

an armature coil and first and second field magnets each formed of a plurality of alternately arranged magnetic poles of N- and S-poles, said field magnets forming a stator element of said linear motor, and said armature coil forming a movable piece element of said linear motor movable with respect to said stator element of said linear motor, wherein said armature coil has a wound structure around a movable piece yoke having a polygonal section and is movable along a shaft extending through a center of said movable piece yoke, and said first field magnet is opposed to one of a plurality of side surfaces of said armature coil extending along the moving direction, said second field magnet is opposed to the side surface among the plurality of side surfaces other than that opposed to said first field magnet, and the field magnets are integrally formed in a bent shape and carried by a carrying member.

11. The linear motor according to claim 10, wherein said carrying member includes a nonmagnetic member interposed between said first and second field magnets.

12. The linear motor according to claim 10, further comprising one or more combinations of said first and second field magnets integrally carried by said carrying member and opposed to different side surfaces of said armature coil, respectively.

13. The linear motor according to claim 12, wherein said carrying member of said combination includes a nonmagnetic member interposed between said first and second field magnets.

14. A linear motor comprising:

a shaft;

a coil bobbin movably provided on said shaft and having a plurality of outer flat surfaces therearound;

an armature coil wound around the coil bobbin;

a field magnet formed of a plurality of magnetic poles of N- and S-poles which are arranged alternately in the lengthwise direction of the shaft, said magnet being opposite to at least two continuous outer flat surfaces of said coil bobbin with a gap therebetween, respectively, and said field magnet having an integral bent form.

15. The linear motor according to claim 14, wherein said field magnet is formed of the integral magnet poles of bent N- and S-poles which are arranged alternately along two continuous outer flat surfaces of said coil bobbin.

16. The linear motor according to claim 15, wherein said field magnet is provided at its bent corner with a recess extending in the lengthwise direction of the shaft.

17. The linear motor according to claim 14, wherein said field magnet is formed of a combination of at least two field magnet parts of a plate type integrated together, each being formed of magnetic poles of N- and S-poles arranged alternately.

18. The linear motor according to claim 17, wherein said field magnet parts are integrally coupled together by a nonmagnetic member with a gap therebetween.

19. The linear motor according to claim 2, wherein said field magnet is formed as an L-shaped magnet having two magnetic parts joined at a corner region, wherein a recess is formed at said corner region.

20. The linear motor according to claim 2, wherein said field magnet is formed as an L-shaped magnet having two magnetic parts joined at a corner region, wherein a non-magnetic member is formed at said corner region.

21. The linear motor according to claim 2, wherein said field magnet is formed as a U-shaped magnet having a first magnetic part joined to a second magnetic part at a first corner region and joined to a third magnetic part at a second corner region, wherein recesses are formed at said first and second corner regions.

22. The linear motor according to claim 2, wherein said field magnet is formed as a U-shaped magnet having a first magnetic part joined to a second magnetic part at a first corner region and joined to a third magnetic part at a second corner region, wherein non-magnetic members are formed at said first and second corner regions.

23. The linear motor according to claim 2, wherein said field magnet is formed as a first L-shaped magnet having two magnetic parts which are respectively adjacent to a first and second faces of said armature coil and are joined at a first corner region, and a second L-shaped magnet having two magnetic parts which are respectively adjacent to a third and fourth faces of said armature coil and are joined at a second corner region, wherein recesses are formed at both said first corner region and said second corner region.

24. The linear motor according to claim 2, wherein said field magnet is formed as a first L-shaped magnet having two magnetic parts which are respectively adjacent to a first and second faces of said armature coil and are joined at a first corner region, and a second L-shaped magnet having two magnetic parts which are respectively adjacent to a third and fourth faces of said armature coil and are joined at a second corner region, wherein non-magnetic members are formed at both said first corner region and said second corner region.

25. The linear motor of claim 14, wherein said field magnet is formed of a combination of at least two magnet parts, each being formed of magnetic poles of N- and S-poles arranged alternately, wherein said magnet parts are joined by a non-zero bent angle.

26. The linear motor of claim 25, wherein said at least two magnet parts form an L-shape.

27. The linear motor of claim 25, wherein said at least two magnet parts form two separate L-shapes, wherein each L-shape faces at least two continuous outer flat surfaces of said coil bobbin.

28. The linear motor of claim 25, wherein said at least two magnet parts form a U-shape.

* * * * *